K. O. LEON.
RESILIENT SUPPORT FOR MACHINERY.
APPLICATION FILED MAR. 2, 1920.

1,370,599. Patented Mar. 8, 1921.

Inventor
K. O. Leon,
By H. R. Kerslake.
Attorney

UNITED STATES PATENT OFFICE.

KARL OSKAR LEON, OF STOCKHOLM, SWEDEN, ASSIGNOR TO NORDISKA KULLAGER AKTIEBOLAGET, OF GOTTENBORG, SWEDEN.

RESILIENT SUPPORT FOR MACHINERY.

1,370,599.                Specification of Letters Patent.         Patented Mar. 8, 1921.

Application filed March 2, 1920. Serial No. 362,862.

*To all whom it may concern:*

Be it known that I, KARL OSKAR LEON, a subject of the King of Sweden, residing at Stockholm, in the county of Stockholm and Kingdom of Sweden, have invented new and useful Improvements in Resilient Supports for Machinery, of which the following is a specification.

The object of this invention is to provide a resilient member suited to take up a load elastically, where it is wanted to provide for a rather slight yielding movement also for a heavy load and where the space in which the yielding member has to be built in is comparatively limited. This invention is especially adapted to be utilized in connection with washers to support the loads in radial antifriction bearings.

According to this invention the yielding member comprises a plurality of coaxial, cylindrical, yielding, metallic elements surrounding each other, and inserted between each adjacent pairs of said elements supporting members, which are disposed on obliquely displaced spots in such a way, that when a load acts upon the member in a radial direction the load will be transmitted on to the stationary support not along a straight line but along bent lines going alternately through the yielding element and through the intermediate supporting members between each pair of the yielding elements. The number of yielding elements in the resilient member varies in accordance with the ability of springing effect as wanted. The intermediate supporting members are displaced alternately between the yielding elements such as for an example concerning one disk or element the points of support are disposed at or near the edge of said element, while concerning the succeeding element the points of support are disposed at or near the center or generally so that the points of support of two adjacent yielding elements can not be gone through by a straight line parallel to the direction of the yielding movement of the member. The parts transmitting the support from one element to another either can be made in one piece with the elements proper or from separate parts placed between the elements.

Some embodiments of the invention diagrammatically are shown in the accompanying drawings, in which—

Figure 6:
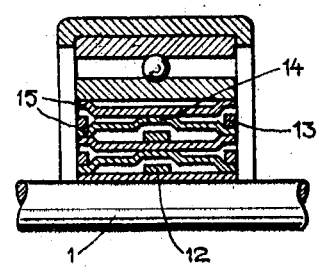
Figure 7:
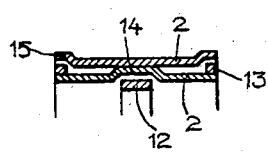

Figures 1 to 5 are axial sections of various embodiments of resilient members suitable to support the inner race ring of radial bearings. Figs. 6 and 7 are cross sections of resilient members, formed by means of forcing or by pressing and Figs. 8—10 side elevations of various forms of cylindrical yielding members.

Figure 1:
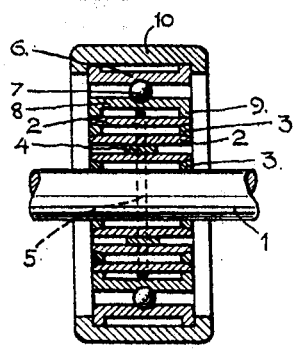

Referring to Fig. 1, 1 indicates a shaft surrounded by a plurality of cylindrical yielding rings 2 arranged concentric to the shaft and are tapered at the edges. The rings bear against each other alternately by means of intermediate rings 3 fitted within the tapered edges of the rings 2 and alternately by means of intermediate rings 4 fitted at the middle of the rings 2. The cylindrical rings 2 and the intermediate rings 3 and 4 are kept in proper position relatively each other and the shaft by means of the bolts or pins 5 or the like. 6 denotes an outer race ring, 7 the balls and 8 an inner race ring for a radial ball bearing, which bears against the outermost yielding ring member 2 by means of ribs 9 projecting radially around the race ring 8 in a manner correspondent to that of the intermediate rings or ribs 3. The outer race rings are encircled by a plummer block 10. With this tapered shape of the intermediate rings 3 the yielding movement will take place at the middle of the rings 2 as well as at their edges, where the rings 3 are liable to move a little out and and in in an axial direction.

Figure 2:
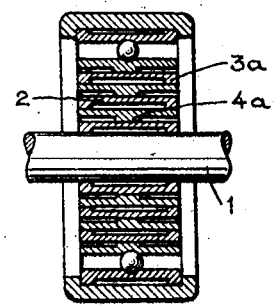

The embodiment shown in Fig. 2 differs from the just described device as far as the intermediate rings are substituted by ribs 3ª, 4ª respectively forming parts of the rings 2 proper.

Figure 3:
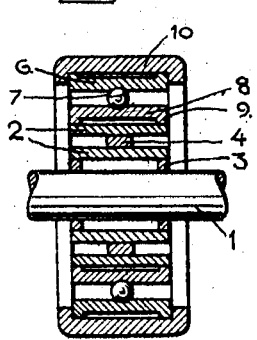

Fig. 3 shows a resilient member similar to the embodiment shown in Fig. 1 with the only difference that the yielding rings 2 are not tapered at their edges. Intermediate rings 4 are located centrally between the adjacent rings 2.

Figure 4:
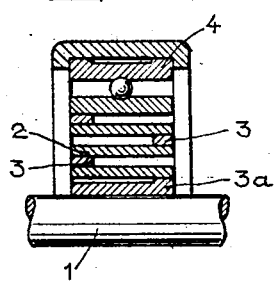

In the resilient member shown in Fig. 4 each ring 2 is supported only at one place by means of an intermediate ring 3 alternately fitted at the one edge or the other of the succeeding rings 2. With this device a considerable yielding effect can be employed even for rather small loads.

Figure 5:
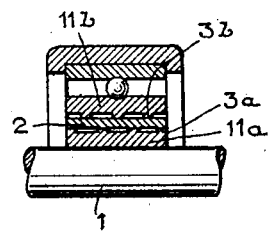

The embodiment according to Fig. 5 consists in a cylindrical ring 11ª around the shaft 1 and provided with a plurality of ribs 3ª. A cylindrical ring 2 bears against the ribs 3ª and is surrounded by a cylindrical ring 11ᵇ bearing against the ring 2 by means of similar ribs 3ᵇ. The ribs 3ª and 3ᵇ are displaced in relation to each other so that the ribs 3ᵇ in ring 11ᵇ make contact with the ring 2 at lines, which intersect the spaces between the ribs 3ª in ring 11ª.

Figs. 6 and 7 shows how the cylindrical rings 2 are given such a section that the intermediate parts 12 and 13 are firmly withheld in proper position. Thus the rings 2 are provided alternately in the center with cup shaped grooves 14 suiting intermediate center parts 12 and alternately at the edges with recessed portions 15 suiting intermediate parts 13 around the edges. Either all the disks are pressed at the edges as shown in Fig. 6 or only every other as is shown in Fig. 7. These recessed types of cylindrical rings 2 can be manufactured by pressing or forcing from smooth cylinders.

Figure 8:
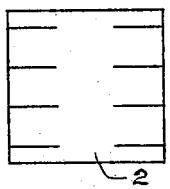
Figure 9:
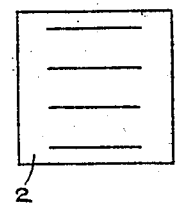
Figure 10:
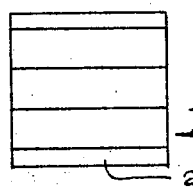

The resilient cylindrical rings 2 can be completed in many different ways. Thus they can be axially cut up from the ends or at their middle portion, as is shown in Figs. 8 and 9 respectively or by axial slots, parted in portions in any convenient manner being held together as is shown in Fig. 10.

The cylindrical rings 2 may be manufactured of such material, that no permanent deformation of the resilient member is effected. In order to increase the resilient ability the rings may be provided with recesses such as illustrated in Figs. 6 and 7.

As well the resilient rings as the intermediate parts 3, 4 etc. may conveniently be manufactured in standard sizes and the resilient member in every case made up of such plurality of rings that suit the load and the resilient ability required.

Having now particularly described and ascertained the nature of my said invention and in what manner the same is to be performed, I declare, that what I claim is:—

1. A resilient member for radial antifriction bearings comprising a plurality of coaxial, cylindrical, yielding, metallic members surrounding each other, supporting members between each adjacent pairs of said yielding members, said supporting members disposed on obliquely displaced spots as and for the purpose set forth.

2. A resilient member for radial antifriction bearings comprising a plurality of coaxial, cylindrical, yielding, metallic members surrounding each other, supporting members between each adjacent pairs of said yielding members, said supporting members disposed on obliquely displaced spots, the yielding members provided with recessed portions adapted to withhold said supporting members in proper positions.

3. A resilient member for radial antifriction bearings comprising a plurality of coaxial, cylindrical, yielding, metallic members surrounding each other, supporting members between each adjacent pairs of said yielding members, said supporting members displaced on obliquely displaced spots, the yielding members provided with recessed portions adapted to withhold said supporting members in proper positions, the yielding members cut through by means of axially disposed slits as and for the purpose set forth.

In testimony whereof I have affixed my signature.

KARL OSKAR LEON.